United States Patent Office 3,133,091
Patented May 12, 1964

3,133,091
MANUFACTURE OF TETRAHYDRO-2,2,4,4-TETRAMETHYL-3-FURANOL
William H. Moore and Wayne V. McConnell, Kingsport, Tenn., assignors to Eastman Kodak Company, Rochester, N.Y., a corporation of New Jersey
No Drawing. Filed Dec. 3, 1962, Ser. No. 241,481
6 Claims. (Cl. 260—347.8)

This invention relates to a process for preparing tetrahydro-2,2,4,4-tetramethyl-3-furanol.

Tetrahydro - 2,2,4,4 - tetramethyl - 3 - furanol has been prepared by heating 2,2,4-trimethyl-1,3,4-pentanetriol in the presence of sulfuric acid (Beilstein 17, I, page 53). This synthesis is not practical in that 2,2,4-trimethyl-1,3,4-pentanetriol is not readily obtainable. Further, the yield obtained is low.

We have discovered that tetrahydro-2,2,4,4-tetramethyl-3-furanol can be readily prepared in good yield by reacting 2,2,4-trimethyl-3-penten-1-ol with an organic peracid such as peracetic acid. The oxidation reaction which takes place can be carried out at a temperature of from about 10° C. to about 70° C. Preferably a temperature of from about 20° C. to about 30° C. is employed. A temperature lower than 10° C. can be used but the reaction rate becomes slower. So far as we are aware any organic peracid can be used in the reaction. Peracetic acid, perbenzoic acid, monoperphthalic acid, performic acid and permaleic acid are illustrative of the organic peracids that can be used. Due to the vigorous nature of the reaction care should be taken that the reaction temperature does not get too high.

As previously indicated tetrahydro-2,2,4,4-tetramethyl-3-furanol is a known compound. It is an excellent solvent for organic compositions, such as linear aromatic polyesters, for example, and is an intermediate for the preparation of alkyl esters (particularly high molecular weight alkyl esters) having excellent hydrolytic and thermal stability. Such esters are of value as plasticizers for vinyl polymers and cellulose esters. Tetrahydro-2,2,4,4-tetramethyl-3-furyl stearate, for example, has been prepared by us from tetrahydro-2,2,4,4-tetramethyl-3-furanol, and has been found to be a plasticizer for polyvinyl chloride.

The following examples illustrate our invention.

Example 1

In a 100 ml. flask, equipped with a mechanical stirrer, condenser, thermometer and addition funnel were mixed 25.6 grams (0.2 mole) of 2,2,4-trimethyl-3-penten-1-ol and 2 grams of anhydrous sodium acetate. The mixture was stirred vigorously and cooled to 20° C.; 38 grams (0.2 mole) of a commercial 40% (by weight) solution of peracetic acid in acetic acid was added dropwise during one hour, maintaining the temperature at 20° C.– 25° C. by means of an ice-water bath. When the addition was completed, the reaction mixture was stirred for two hours longer at 23° C.–25° C., then poured into two volumes of water. The clear solution thus obtained was neutralized to pH 6 with sodium carbonate; whereby an oily layer separated. The oil was separated and dissolved in 100 ml. of ethyl ether. The ether solution was washed with a 5% aqueous sodium bicarbonate solution and dried over sodium sulfate. After evaporation of the ether, and distillation of the residue in vacuo, there was obtained 12.7 grams of tetrahydro-2,2,4,4-tetramethyl-3-furanol boiling at 53° C.–55° C. at 1 mm. pressure. Continuous ether extraction of the combined aqueous layer and washings yielded an additional 4.8 grams of product. Analysis C, theoretical=66.67%; found 66.24%. H, theoretical=11.11%; found 11.77%. O, theoretical=22.22%; found 22.55%.

Example 2

A mixture of 128 grams (1 mole) of 2,2,4-trimethyl-3-penten-1-ol, 30 grams (0.5 mole) of glacial acetic acid and 25 grams (0.32 mole) of benzene were stirred together and heated to 50° C. 3.2 grams (0.03 mole) of concentrated sulfuric acid were added, causing a temperature rise to 55° C. 125 grams (1.1 moles) of 30% hydrogen peroxide were added dropwise during two hours at 55° C.–65° C. The reaction mixture was then stirred at 60° C.–65° C. for 20 hours. The mixture was cooled and the organic layer separated and added to 100 ml. of benzene. The benzene solution was washed with a 5% aqueous sodium bicarbonate solution, then with water to remove all of the acid, then dried over sodium sulfate. The benzene was evaporated and the residual oil distilled in vacuo to yield 45.4 grams of tetrahydro-2,2,4,4-tetramethyl-3-furanol, boiling at 78° C.–81° C. at 8 mm. pressure. Continuous ether extraction of the combined aqueous layer and washings, after neutralization with sodium carbonate, gave an additional 17.8 grams of product boiling at 57° C.–60° C. at 1.2 mm. pressure.

As illustrated by Example 2, the organic peracid can be formed in situ. Accordingly, the term "organic peracid," unless otherwise indicated, includes preformed organic peracids and also organic peracids formed in situ. Also, while our invention has been illustrated in connection with the use of peracetic acid another organic peracid can be used in place of peracetic acid. Mixtures of organic peracids can be employed in our novel process. Organic peracids, in addition to those previously named, that can be used in our process include perchloracetic acid, perbutyric acid, percaprylic acid, diperadipic acid, and dipersebacic acid, for example. U.S. Patent 2,813,896 discloses a process for preparing organic peracids.

The preparation of 2,2,4-trimethyl-3-penten-1-ol is described and claimed in Hagemeyer and Hull U.S. Patent 2,941,011 issued June 14, 1960.

Esters can be prepared from tetrahydro-2,2,4,4-tetramethyl-3-furanol using known esterification procedures. Tetrahydro-2,2,4,4-tetramethyl-3-furyl stearate was prepared by reacting stearic acid with tetrahydro-2,2,4,4-tetramethyl-3-furanol in the presence of titanium butoxide as a catalyst. Another titanium alkoxide, such as titanium isopropoxide, can be employed as a catalyst.

Tetrahydro-2,2,4,4-tetramethyl-3-furyl esters and a novel process for their preparation are described and claimed in our copending U.S. application, Serial No. 242,055, filed December 4, 1962.

Although the invention has been described in considerable detail with reference to certain preferred embodiments thereof, it will be understood that variations and modifications can be effected without departing from the spirit and scope of the invention as described hereinbefore and as defined in the appended claims.

We claim:

1. A process of preparing tetrahydro-2,2,4,4-tetramethyl-3-furanol which comprises reacting 2,2,4-trimethyl-3-penten-1-ol with an organic peracid.

2. A process of preparing tetrahydro-2,2,4,4-tetramethyl-3-furanol which comprises reacting 2,2,4-trimethyl-3-penten-1-ol with an organic peracid at a temperature of from about 10° C. to about 70° C.

3. A process of preparing tetrahydro-2,2,4,4-tetramethyl-3-furanol which comprises reacting 2,2,4-trimethyl-3-penten-1-ol with an organic peracid at a temperature of from about 20° C. to about 30° C.

4. A process of preparing tetrahydro-2,2,4,4-tetramethyl-3-furanol which comprises reacting 2,2,4-trimethyl-3-penten-1-ol with peracetic acid.

5. A process of preparing tetrahydro-2,2,4,4-tetramethyl-3-furanol which comprises reacting 2,2,4-trimethyl-3-penten-1-ol with peracetic acid at a temperature of from about 10° C. to about 70° C.

6. A process of preparing tetrahydro-2,2,4,4-tetramethyl-3-furanol which comprises reacting 2,2,4-trimethyl-3-penten-1-ol with peracetic acid at a temperature of from about 20° C. to about 30° C.

No references cited.